(12) United States Patent
Nishikawa et al.

(10) Patent No.: US 10,529,963 B2
(45) Date of Patent: Jan. 7, 2020

(54) ENERGY STORAGE APPARATUS

(71) Applicant: GS Yuasa International Ltd., Kyoto-shi (JP)

(72) Inventors: Ryutaro Nishikawa, Kyoto (JP); Masamitsu Tononishi, Kyoto (JP); Osamu Ushijima, Kyoto (JP); Shogo Tsuruta, Kyoto (JP)

(73) Assignee: GS YUASA INTERNATIONAL LTD., Kyoto-Shi, Kyoto (JP)

( * ) Notice: Subject to any disclaimer, the term of this patent is extended or adjusted under 35 U.S.C. 154(b) by 20 days.

(21) Appl. No.: 14/227,110

(22) Filed: Mar. 27, 2014

(65) Prior Publication Data
US 2014/0295250 A1 Oct. 2, 2014

(30) Foreign Application Priority Data
Mar. 29, 2013 (JP) .................. 2013-073581

(51) Int. Cl.
*H01M 2/10* (2006.01)

(52) U.S. Cl.
CPC .................. *H01M 2/1077* (2013.01)

(58) Field of Classification Search
CPC ............. H01M 2/1077; H01M 2/1061; H01M 2/1022; H01M 2/0242
USPC ....................................... 429/177
See application file for complete search history.

(56) References Cited

U.S. PATENT DOCUMENTS

| | | | |
|---|---|---|---|
| 5,686,202 A * | 11/1997 | Hooke | H01M 2/0242 29/623.2 |
| 6,444,353 B1 | 9/2002 | Takaki et al. | |
| 6,586,132 B1 * | 7/2003 | Fukuda | H01M 2/1077 429/120 |
| 7,989,104 B2 | 8/2011 | Jeon et al. | |
| 2006/0093899 A1 | 5/2006 | Jeon et al. | |
| 2010/0196749 A1 * | 8/2010 | Yoshida | H01M 2/0242 429/99 |
| 2011/0195284 A1 | 8/2011 | Yasui et al. | |
| 2012/0082875 A1 | 4/2012 | Watanabe et al. | |
| 2012/0263991 A1 * | 10/2012 | Temmyo | H01M 2/1077 429/120 |

(Continued)

FOREIGN PATENT DOCUMENTS

| | | |
|---|---|---|
| CN | 102447145 A | 5/2012 |
| JP | S49-140619 U | 12/1974 |

(Continued)

OTHER PUBLICATIONS

Komura et al., Machine translation of JP 2012-216360 A, Nov. 2012 (Year: 2012).*

*Primary Examiner* — Milton I Cano
*Assistant Examiner* — Jennifer A Moss
(74) *Attorney, Agent, or Firm* — McGinn I.P. Law Group, PLLC.

(57) ABSTRACT

An energy storage apparatus including: an energy storage device; and an outer housing including a bottom surface, a side wall extending from the bottom surface in a first direction that intersects the bottom surface, and a support member that supports the side wall. An end of the side wall in the first direction is positioned in a first region that is further in the first direction than an end of a case of the energy storage device in the first direction. The support member is connected to the side wall in at least the first region and supports the side wall.

20 Claims, 7 Drawing Sheets

(56) References Cited

U.S. PATENT DOCUMENTS

2013/0052515 A1* 2/2013 Park .................... H01M 2/1077
429/159

FOREIGN PATENT DOCUMENTS

| | | |
|---|---|---|
| JP | H10-322847 A | 12/1998 |
| JP | 2000-251952 A | 9/2000 |
| JP | 2003-142058 A | 5/2003 |
| JP | 2006-128122 A | 5/2006 |
| JP | 2010-015760 A | 1/2010 |
| JP | 2010-140695 A | 6/2010 |
| JP | 2011-071097 A | 4/2011 |
| JP | 2011-210582 A | 10/2011 |
| JP | 2011-222369 A | 11/2011 |
| JP | 2012-009332 A | 1/2012 |
| JP | 2012-128983 A | 7/2012 |
| JP | 2012-128984 A | 7/2012 |
| JP | 2012216360 A * | 11/2012 |

* cited by examiner

ENERGY STORAGE APPARATUS

CROSS-REFERENCE TO RELATED APPLICATION

The present application is based on and claims priority of Japanese Patent Application No. 2013-073581 filed on Mar. 29, 2013. The entire disclosure of the above-identified application, including the specification, drawings, and claims is incorporated herein by reference in its entirety.

FIELD

The present invention relates to energy storage apparatuses including an outer housing that houses an energy storage device.

BACKGROUND

Energy storage apparatuses including an outer housing that houses a plurality of battery cells are well known. An example of such an energy storage apparatus is disclosed in Patent Literature 1 (Japanese Patent No. 4638528). The outer housing in such energy storage apparatuses forms a housing space for housing the battery cells and includes an opening. The outer housing is typically a six-sided, box-shaped component having the opening in place of one of the six sides. More specifically, the outer housing has four side walls extending from and perpendicular to a rectangular bottom surface.

SUMMARY

The following presents a simplified summary of the invention disclosed herein in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

One aspect of the present invention provides an energy storage apparatus having a structure that can minimize deflection of a side wall of the outer housing of the energy storage apparatus.

The energy storage apparatus according to one aspect of the present invention includes: an energy storage device; and an outer housing including a bottom surface, a side wall extending from the bottom surface in a first direction that intersects the bottom surface, and a support member that supports the side wall, wherein an end of the side wall in the first direction is positioned in a first region that is further in the first direction than an end of a case of the energy storage device in the first direction, and the support member is connected to the side wall in at least the first region and supports the side wall.

BRIEF DESCRIPTION OF DRAWINGS

These and other objects, advantages and features of the invention will become apparent from the following description thereof taken in conjunction with the accompanying drawings that illustrate a specific embodiment of the present invention.

Figure 1:
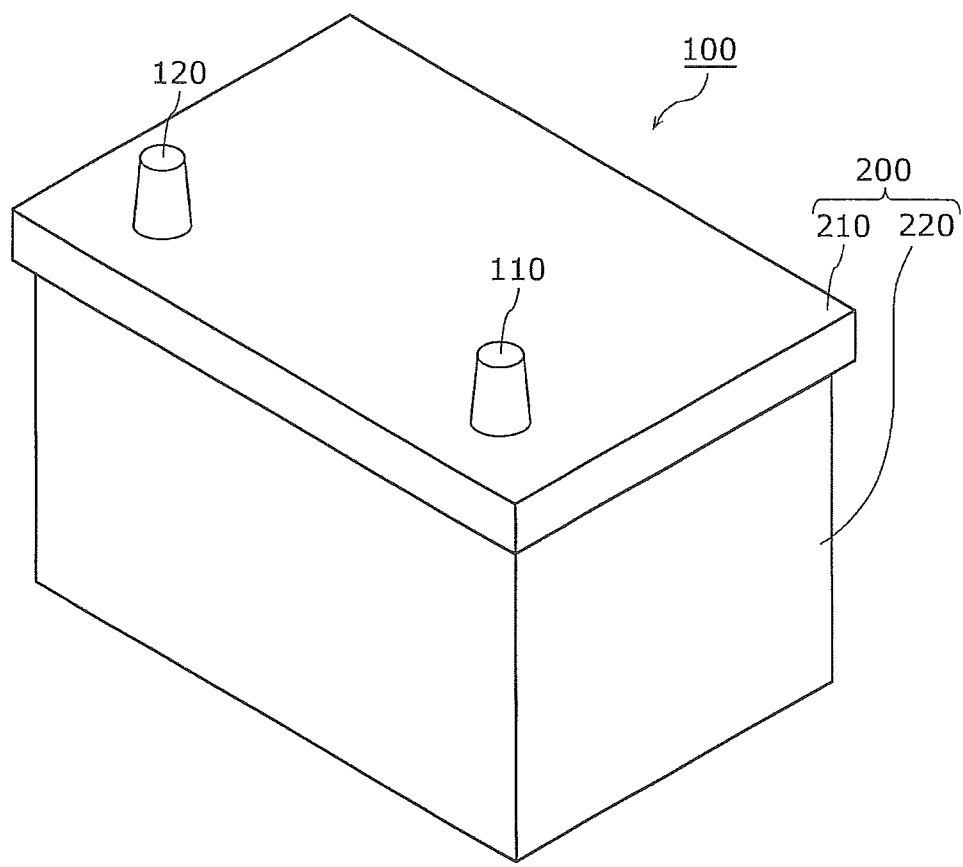
FIG. 1 is a perspective view of the energy storage apparatus according to an embodiment of the present invention.
Figure 1:
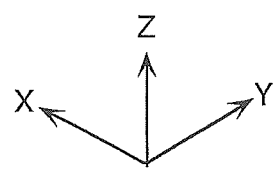

DESCRIPTION OF EMBODIMENT (Underlying Knowledge Forming Basis of the Present Invention)

In relation to the energy storage apparatus disclosed in the Background section, the inventors have found the following points.

According to the art taught by Patent Literature 1, the outer housing is relatively large since it forms a space for housing a plurality of battery cells. In other words, the surface area of the side walls included in the outer housing is relatively large. Portions of a side wall facing a battery cell are supported by the battery cell, and as such, are not prone to deflection, but portions of a side wall not facing a battery cell (in other words, portions projecting from the battery cell) are not supported by the battery cell, and thus are susceptible to deflection.

According to the art taught by Patent Literature 1, the outer housing main body houses battery cells therein. In the region of the outer housing main body in which the battery cells are housed, the side walls of the outer housing main body are supported by the battery cells, making it possible to minimize deflection of the side walls. However, the portions of the side walls above the battery cells are not provided with a supporting component, and as such, deflection of the side walls cannot be controlled.

When a side wall of the outer housing main body deflects, not just the outer appearance of the energy storage apparatus suffers; work performance in regard to assembly decreases. For example, during assembly, battery cells and a restricting component (inner cover) for restricting movement of the battery cells are inserted inside the outer housing main body. Since the opening of the outer housing main body narrows when a side wall deflects, the narrowed opening must be widened before inserting the battery cells and the inner cover. As a result, extra work is required when inserting the battery cells and the inner cover into the outer housing main body, which diminishes productivity. Moreover, when the outer housing main body of the energy storage apparatus includes a top cover and a side wall of the outer housing main body deflects, extra work is also required in assembling the top cover. Although increasing the rigidity of the side walls will minimize deflection, this requires part of the material used to be a rigid material such as metal or the thickness of the side walls to be increased, resulting in increased manufacturing costs.

One aspect of the present invention provides an energy storage apparatus having a structure that can minimize deflection of a side wall of the outer housing of the energy storage apparatus.

According to one aspect of the present invention, an energy storage apparatus includes: an energy storage device; and an outer housing including a bottom surface, a side wall extending from the bottom surface in a first direction that intersects the bottom surface, and a support member that supports the side wall, wherein an end of the side wall in the first direction is positioned in a first region that is further in the first direction than an end of a case of the energy storage device in the first direction, and the support member is connected to the side wall in at least the first region and supports the side wall.

With this configuration, deflection of the side wall can be minimized since the support member supports the side wall of the outer housing in a position located in the first region.

The side wall may comprise a pair of side walls opposed to each other, and the support member may be connected to the pair of side walls in at least the first region and may support the pair of side walls.

With this configuration, since the support member supports the pair of side walls that are opposed to each other, it is possible to minimize deflection of the two side walls with a single support member. This further simplifies the manufacturing process of the outer housing.

The outer housing may include a cover including an engagement portion that engages with the side wall.

With this configuration, the outer housing further includes the cover including the engagement portion that engages with the side wall of the outer housing main body. The support member can minimize deflection of the side wall even when the outer housing has such a configuration, making assembling the outer housing main body and the cover easier.

The energy storage apparatus may further include an abutment member disposed adjacently to the energy storage device in the first direction, the abutment member abutting against the energy storage device, wherein the support member may be connected to the side wall in a second region and support the side wall, the second region being further in the first direction than the abutment member.

With this configuration, deflection of the side wall into the housing space can be minimized in the second region as well since the support member supports the side wall of the outer housing in the second region. As such, even when the energy storage apparatus has the structure in which the abutment member is disposed adjacently to the energy storage device in the first direction and supports the side wall of the outer housing, it is possible to minimize deflection of the side wall further in the first direction than the abutment member as well.

The energy storage device may include a plurality of energy storage devices, the outer housing may house the energy storage devices, and the support member may be a partition that is provided between the energy storage devices and partitions a housing space that is formed by the outer housing and houses the energy storage devices.

With this configuration, the support member has multiple functions including the function of minimizing deflection of the side wall as a support member and the function of ensuring insulation of the plurality of energy storage devices as a partition. This makes the manufacturing process of the outer housing simpler than when one component has only one function.

The support member may include a notch or a through-hole.

With this configuration, even when the support member has the structure that includes the notch or the through-hole, the support member can support the side wall.

The side wall of the outer housing may extend in the first direction and in a second direction that intersects the first direction, and the support member may be integrally formed with the side wall in a vicinity of a center of the side wall in the second direction.

With this configuration, the support member is formed in the vicinity of the center of the side wall in the second direction, where deflection is most likely to occur. This makes it possible for the support member to more effectively minimize deflection of the side wall of the outer housing.

The support member may increase its rigidity as it extends in the first direction.

With this configuration, since the rigidity of the support member increases in the first direction, it is possible to support a portion of the side wall of the outer housing that is more prone to deflection with a more rigid support member. As such, the support member can further sufficiently minimize deflection of the side wall of the outer housing.

The support member may increase its thickness as it extends in the first direction.

Since the support member increases in thickness in the first direction, the rigidity of the support member increases in the first direction. As such, the support member can further sufficiently minimize deflection of the side wall of the outer housing.

Hereinafter, an exemplary embodiment is described in greater detail with reference to the accompanying Drawings. It should be noted that the embodiment described below shows a preferred, specific example of the present invention. The numerical values, shapes, materials, structural elements, the arrangement and connection of the structural elements etc. shown in the following embodiment are mere examples, and therefore do not limit the present invention. As such, among the structural elements in the following embodiment, structural elements not recited in any one of the independent claims are described as arbitrary structural elements of a preferred embodiment.

Embodiment

Figure 2:
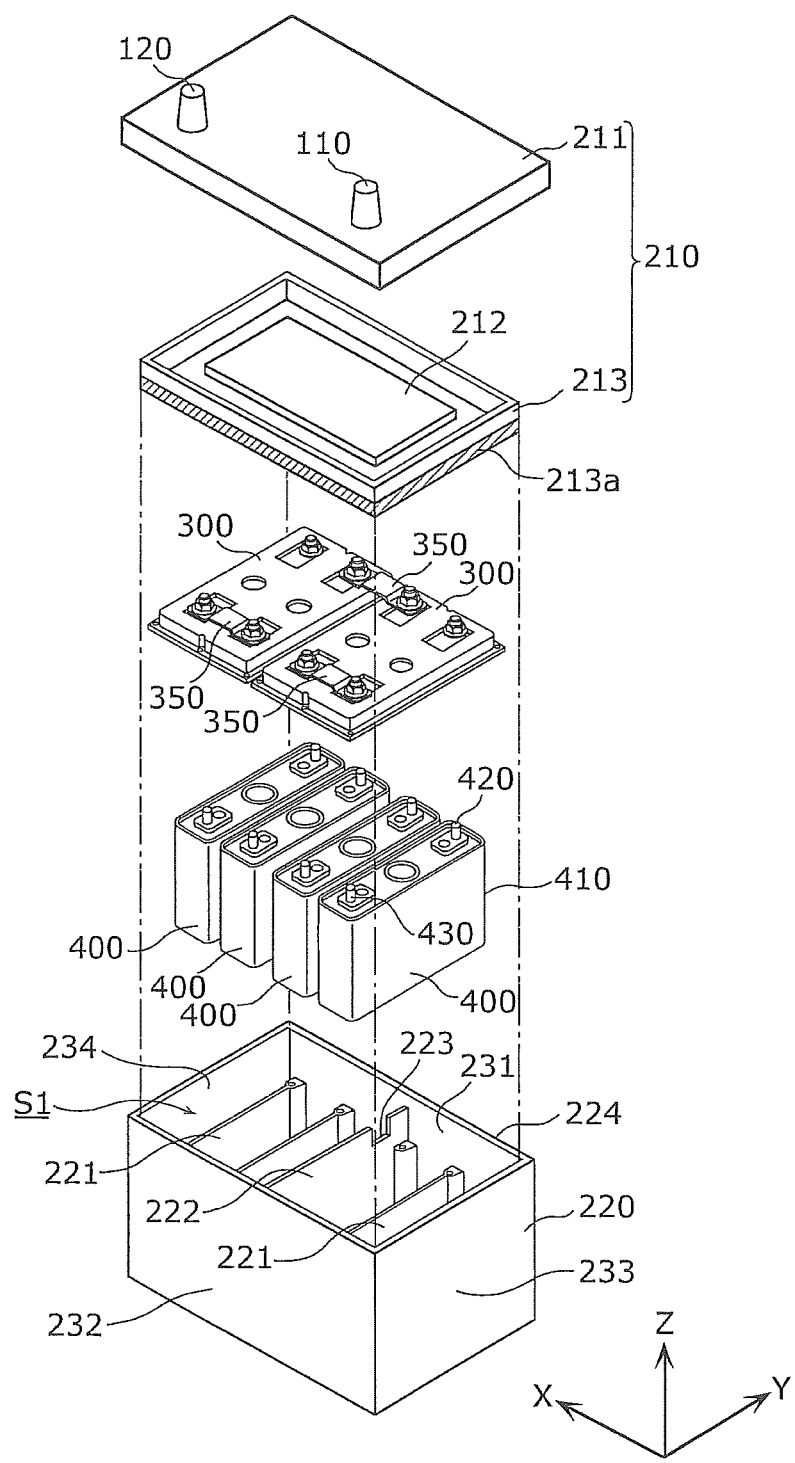
FIG. 2 is an exploded perspective view of the energy storage apparatus.

FIG. 1 is a perspective view of the energy storage apparatus according to the embodiment of the present invention. FIG. 2 is an exploded perspective view of the energy storage apparatus.

As FIG. 1 and FIG. 2 illustrate, the energy storage apparatus 100 includes an outer housing 200, a cell frame 300, and a plurality (four in the embodiment) of energy storage devices 400.

The outer housing 200 is a box-shaped component that houses the cell frame 300 and the energy storage devices 400. In other words, the outer housing 200 includes a bottom surface 235 (see FIG. 4) and side walls 231 through 234. The outer housing 200 also forms a housing space S1 for housing the energy storage device 400. The outer housing 200 includes an outer housing main body 220 and a cover 210. The outer housing main body 220 arranges the energy storage devices 400 in predetermined positions, protects each energy storage device 400 from impact and such, and keeps each energy storage device 400 from unintentionally contacting metal components and such. The outer housing 200 is made from an insulating material such as resin. The outer housing 200 includes an outer positive electrode terminal 110 and an outer negative electrode terminal 120. The outer positive electrode terminal 110 and the outer negative electrode terminal 120 are terminals connected to an external load to supply power stored in the energy storage apparatus 100 to the external load or terminals connected to an external power source to store energy supplied from the external power source in the energy storage apparatus 100.

The cover 210 is configured of a top cover 211 and a cover main body 213. A space is formed between the top cover 211 and the cover main body 213 in the cover 210, and a control circuit 212 is housed in this space. The cover main body 213 of the cover 210 includes an engagement portion 213a (the portion shaded with diagonal lines in FIG. 2) which engages with the inner peripheral edge of an opening 224 of the outer housing main body 220. The cover 210 along with the outer housing main body 220 form the housing space S1 as a result of the engagement portion 213a sealing the opening 224 of the outer housing main body 220. In other words, the engagement portion 213a engages with the side walk 231 through 234.

The outer housing main body 220 includes the bottom surface 235 and the side walls 231 through 234. The side walls 231 through 234 form the opening 224 of the outer housing main body 220. In the outer housing main body 220, the pair of side walls 231 and 232 are opposed to each other, and the pair of side walls 233 and 234 are opposed to each other. The pair of side walls 231 and 232 extend in the Z axis direction (upward; the first direction) as well as the X axis direction (the second direction) that intersects (at a right angle in the embodiment) the Z axis direction. The pair of side walls 233 and 234 extend in the Z axis direction as well as the Y axis direction that intersects (at a right angle in the embodiment) the Z axis direction. In order to house each of the energy storage devices 400, the outer housing main body 220 includes a plurality of first partition plates 221 and a second partition plate 222. The first partition plates 221 and the second partition plate 222 partition (divide) the housing space S1 formed in the outer housing main body 220 into a plurality of spaces, and the energy storage devices 400 are individually housed in the partitioned spaces.

A plurality of the cell frames 300 (two in the embodiment) are provided above the energy storage devices 400. One of the two cell frames 300 is provided to one side of the second partition plate 222 in the X axis direction, and the other of the two cell frames 300 is provided to the other side of the second partition plate 222 in the X axis direction. In other words, each of the two cell frames 300 is an abutment member that abuts against two energy storage devices 400. Each of the two cell frames 300 may also function as a restricting component that restricts movement of the corresponding energy storage devices. Each of the two cell frames 300 binds the upper portions of two of the energy storage devices 400 together. The cell frame 300 is made from an insulating material such as resin.

The energy storage device 400 is an element capable of charging and discharging. The energy storage device 400 includes a case 410, a positive electrode terminal 420, and a negative electrode terminal 430. The case 410 is formed from an electrically conductive material (such as metal). The positive electrode terminal 420 and the negative electrode terminal 430 protrude from the top of the case 410. The energy storage devices 400 are lined up in a single row in the X axis direction. Two opposite polarity terminals of different ones the energy storage devices 400 are electrically connected together with a bus bar 350, which is a metal plate-like component (an electrically conductive component). In other words, the energy storage devices 400 are connected together in series by the bus bars 350. The positive electrode sides of the energy storage devices 400 connected together in series by the bus bars 350 are connected to the outer positive electrode terminal 110 and the negative electrode sides are connected to the outer negative electrode terminal 120. It should be noted that the energy storage devices 400 are not limited to being connected in series. The energy storage devices 400 may be connected in parallel, or may be connected using a combination of series and parallel connections.

Figure 3:
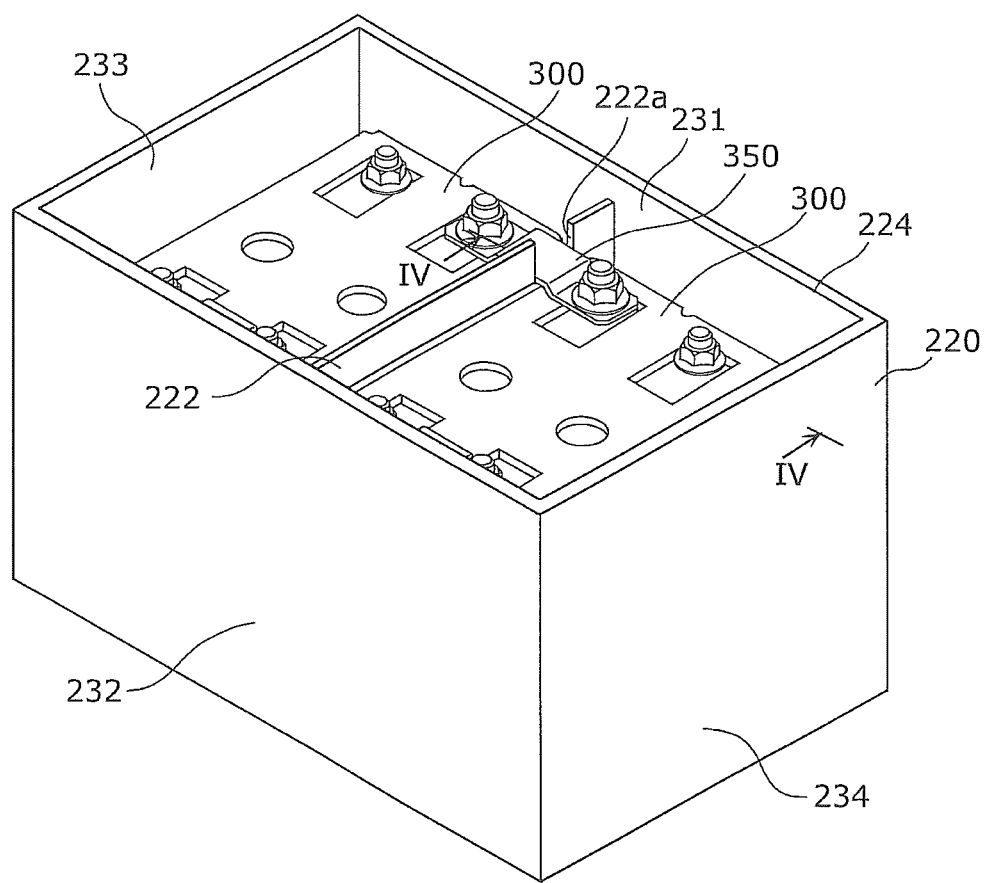
FIG. 3 is a perspective view of an assembly in which the energy storage devices are secured to the outer housing main body by the cell frames.
Figure 4:
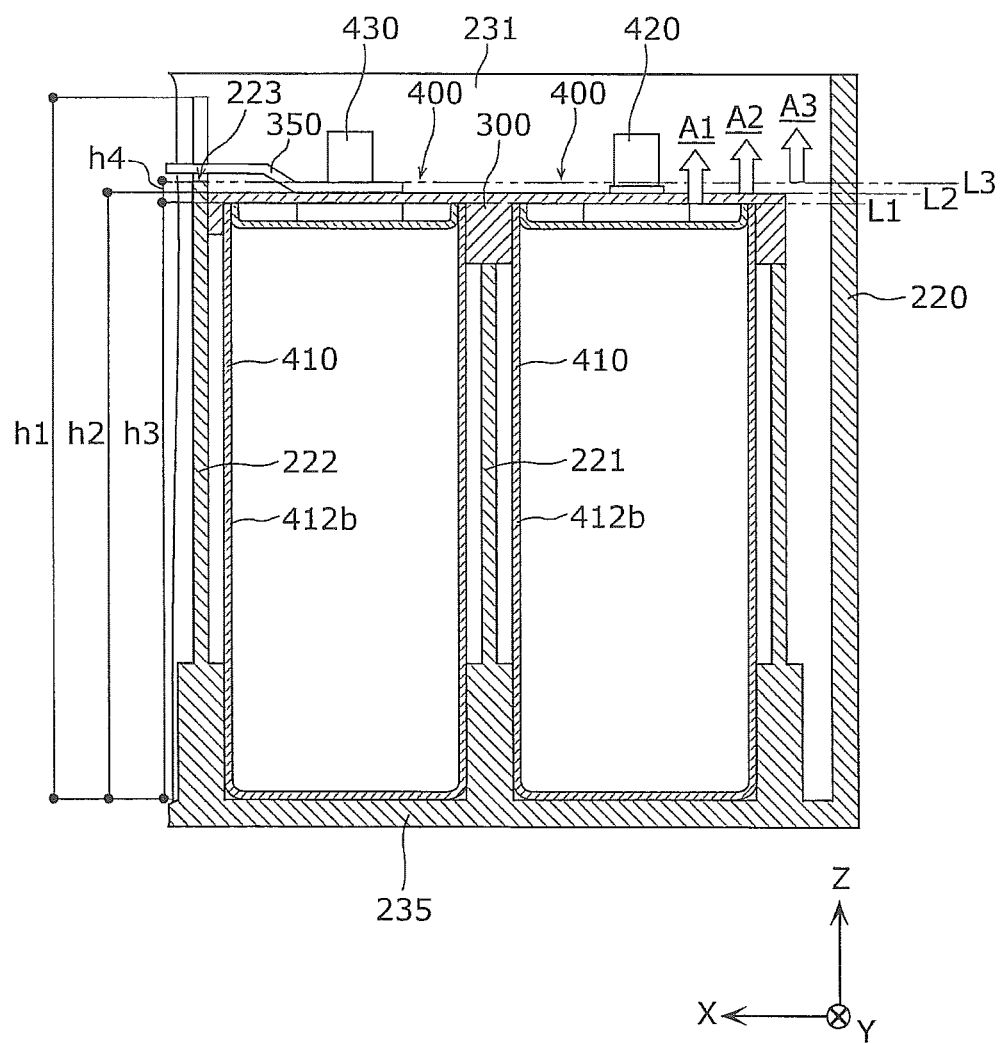
FIG. 4 is a cross section view along line IV-IV in FIG. 3 of an assembly in which the energy storage devices are secured to the outer housing main body by the cell frames.

FIG. 3 is a perspective view of an assembly in which the energy storage devices are secured to the outer housing main body by the cell frames. FIG. 4 is a cross section view along line IV-IV in FIG. 3 of an assembly in which the energy storage devices are secured to the outer housing main body by the cell frames.

As is illustrated in FIG. 3 and FIG. 4, the side walls 231 through 234 of the outer housing main body 220 have ends located in the Z axis direction that are positioned in a first region A1. The first region A1 is a region above the ends of the cases 410 of the energy storage devices 400 located in the Z axis direction (the region above line L1 illustrated in FIG. 4) (hereinafter "Z axis direction" is referred to in spatially relative terms, such as "upward", "above", "upper" and the like). As is illustrated in FIG. 4, the second partition plate 222 of the outer housing main body 220 has a height h1 measured relative to the bottom surface 235 of the outer housing main body 220 that is greater than a height h3 of the cases 410 of the energy storage devices 400 measured relative to the bottom surface 235. Since the second partition plate 222 connects the pair of side walls 231 and 232 in at least the first region A1, the second partition plate 222 also functions as a support member for supporting the pair of side walls 231 and 232. The second partition plate 222 supports the pair of side walls 231 and 232 to keep the side walls 231 and 232 from deflecting. The second partition plate 222 is connected to the pair of side walls 231 and 232 as a result of being integrally formed with the pair of side walls 231 and 232. The second partition plate 222 is connected to the pair of side walls 231 and 232 at positions in the vicinity of the center of the pair of side walls 231 and 232 in the X axis direction. The second partition plate 222 is a plate-like component formed continuously from the bottom surface 235 to the first region A1. The pair of side walls 231 and 232 connected by the second partition plate 222 are arranged parallel to the X axis direction, which is the arrangement direction of the energy storage devices 400. The pair of side walls 231 and 232 connected by the second partition plate 222 are the long sides of the outer housing 200.

The second partition plate 222 is connected to and supports the pair of side walls 231 and 232 of the outer housing main body 220 in a second region A2. The second region A2 is a region above the cell frames 300 (the region above line L2 illustrated in FIG. 4). As is illustrated in FIG. 4, the second partition plate 222 of the outer housing main body 220 has a height h1 measured relative to the bottom surface 235 of the outer housing main body 220 that is greater than a height h2 which is a combined height of the case 410 of the energy storage devices 400 and the cell frame 300 measured relative to the bottom surface 235.

Moreover, a notch 223 for the bus bar 350 to pass through is formed in the second partition plate 222 in a third region A3. The third region A3 is a region above a position located a predetermined distance h4 above the upper end of the cases 410 of the energy storage devices 400 (the region above line L3 illustrated in FIG. 4).

As is illustrated in FIG. 3 and FIG. 4, the two cell frames 300 sandwich the energy storage devices 400 housed in predetermined positions in the outer housing main body 220 from above, against the outer housing main body 220. The two cell frames 300 are joined to the outer housing main body 220 by joining parts not illustrated in the drawings while the two cell frames 300 are sandwiching the energy storage devices 400 in the Z axis direction from above, against the bottom surface 235 of the outer housing 200, so that the energy storage devices 400 are also sandwiched from below.

The joining parts may be a configuration which joins the cell frames and the outer housing main body together with a bolt and nut or with a rivet. The cell frames and the outer housing main body may be provided with portions that are in close contact with each other, and the joining parts may be a configuration which joins these portions with an adhesive. Either the cell frames or the outer housing main body may be provided with a recessed portion and the other of the cell frames and the outer housing main body may be provided with a protruding portion that engages with the recessed portion, and the joining parts may be a configuration which joins the cell frames and the outer housing main body together by engagement (by pressing) of the recessed portions and the protruding portions. The joining parts may be snap-fit joints which join the cell frames and the outer housing main body together.

With the configuration of energy storage apparatus 100 according to the embodiment, it is possible to minimize deflection of the pair of side walls 231 and 232 of the outer housing 200 since the second partition plate 222 supports the pair of side walls 231 and 232 in the first region A1. The second partition plate 222 is capable of minimizing both deflection of the pair of side walls 231 and 232 into the housing space S1 as well as away from the housing space S1.

Since deflection of the pair of side walls 231 and 232 can be minimized, the opening 224 can be kept from narrowing. This decreases the amount of work required to assemble the energy storage devices 400, the cell frames 300, the cover 210 etc. to the outer housing 200. This in turn makes it possible to keep manufacturing costs of the energy storage apparatus 100 down and improve productivity. It is possible to minimize damage to the outward appearance of the energy storage apparatus 100 from deflection of the pair of side walls 231 and 232 of the outer housing 200.

With the configuration of the energy storage apparatus 100 according to the embodiment, the second partition plate 222 supports the pair of side walls 231 and 232 that are opposed to each other. It is possible to minimize deflection of the two side walls 231 and 232 with a single second partition plate 222 functioning as a support member. This further simplifies the manufacturing process of the outer housing 200.

With the configuration of the energy storage apparatus 100 according to the embodiment, the outer housing 200 is configured of (i) the outer housing main body 220 including the opening 224 and (i) the cover 210 including the engagement portion 213a which engages with the inner peripheral edge of the opening 224 of the outer housing main body 220. Even with the outer housing 200 having this kind of configuration, the outer housing main body 220 and the cover 210 can be assembled together easily since the second partition plate 222 can minimize deflection of the pair of side walls 231 and 232 of the outer housing 200.

With the configuration of the energy storage apparatus 100 according to the embodiment, the second partition plate 222 supports the pair of side walls 231 and 232 of the outer housing 200 in the second region A2, and as such, it is possible to minimize deflection of the pair of side walls 231 and 232 of the outer housing 200 at the second region A2 into the housing space S1. As a result, even when the energy storage apparatus 100 is structured such that the cell frames 300 are arranged above the energy storage devices 400 and the pair of side walls 231 and 232 of the outer housing 200 are supported by the cell frames 300, it is possible to minimize deflection of the pair of side walls 231 and 232 occurring above the cell frames 300.

With the configuration of the energy storage apparatus 100 according to the embodiment, it is possible to minimize deflection of the side walls 231 and 232 even when the outer housing 200 houses a plurality of energy storage devices 400 and the surface area of the side walls 231 and 232 of the outer housing 200 included in the energy storage apparatus 100 is relatively large.

With the configuration of the energy storage apparatus 100 according to the embodiment, the second partition plate 222 fulfills multiple functions including the function of minimizing deflection of the pair of side walls 231 and 232 as a support member and the function of ensuring insulation of the plurality of energy storage devices 400 as a partition. This makes the manufacturing process of the outer housing 200 simpler than when one component fulfills only one function.

With the configuration of the energy storage apparatus 100 according to the embodiment, the second partition plate 222 can support the pair of side walls 231 and 232 even when the notch 223 is formed therein. In other words, by providing such a second partition plate 222, it is possible to position the bus bars 350 in place and minimize deflection of the pair of side walls 231 and 232 of the outer housing 200 into the housing space S1.

With the configuration of the energy storage apparatus 100 according to the embodiment, the second partition plate 222 is formed in a position in which deflection is most likely to occur—the vicinity of the center of the pair of side walls 231 and 232 in the X axis direction. This makes it possible to more effectively minimize deflection of the pair of side walls 231 and 232 of the outer housing 200.

With the configuration of the energy storage apparatus 100 according to the embodiment, the second partition plate 222 is component that completely partitions the energy storage devices 400 from each other. This sufficiently insulates the energy storage devices 400 from each other. This also makes it possible to increase the rigidity of the second partition plate 222 and sufficiently minimize deflection of the pair of side walls 231 and 232.

MODIFIED EMBODIMENTS

Hereinbefore, the energy storage apparatus according to the present invention has been described based on the exemplary embodiment, but the scope of the present invention is not limited thereto. Various modifications of the exemplary embodiment as well as embodiments resulting from arbitrary combinations of constituent components of different exemplary embodiments that may be conceived by those skilled in the art are included within the scope of the present invention as long as these do not depart from the essence of the present invention.

First Modified Embodiment

Figure 5:
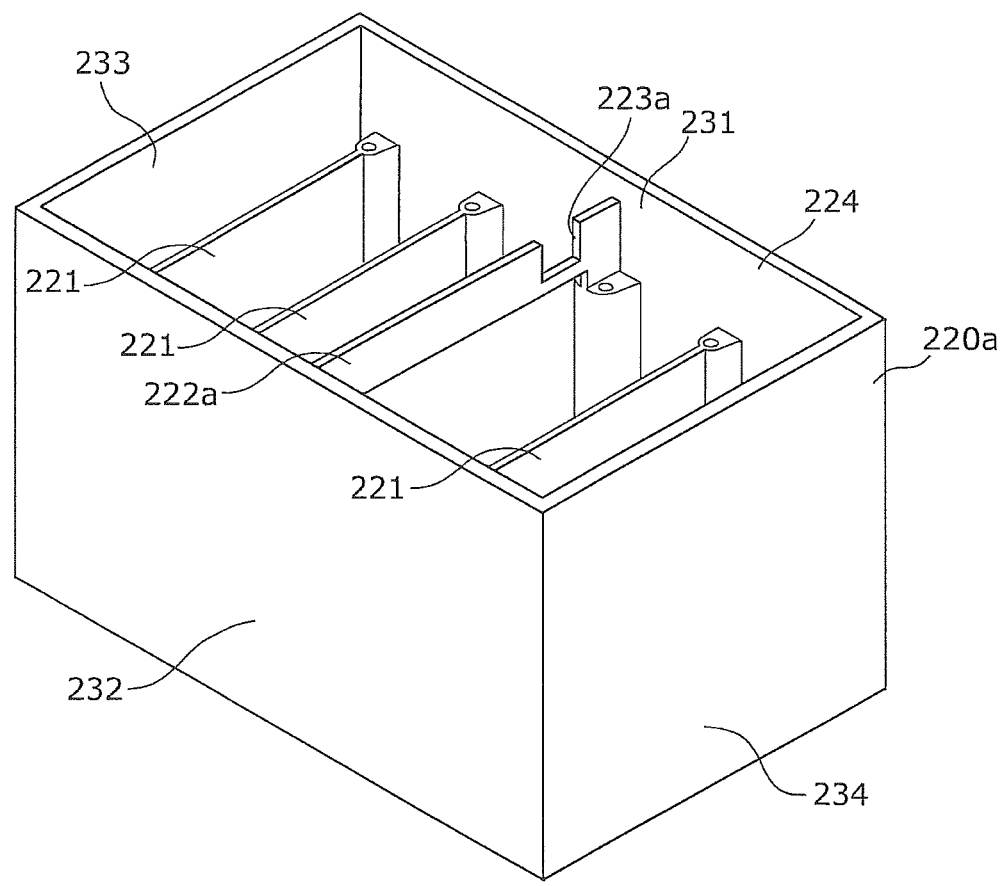
FIG. 5 is a perspective view of the outer housing main body according to a first modified embodiment.
Figure 5:
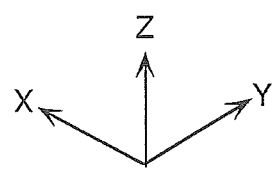

With the configuration of the energy storage apparatus 100 in the above embodiment, the second partition plate 222 as the support member is a plate-like component formed continuously from the bottom surface 235 to the first region A1. However, the second partition plate 222 is not required to be formed continuously from the bottom surface 235 to the first region A1. For example, a support member 222*a* that supports the pair of side walls 231 and 232 in the first region A1, such as is illustrated in an outer housing main body 220*a* in FIG. 5, may be used as a substitute for the second partition plate 222. In other words, as long as the support member 222*a* is connected to the side walls 231 and 232 in at least the first region A1 and supports the pair of side walls 231 and 232, the support member 222*a* is effective since it can minimize deflection of the pair of side walls 231 and 232 of the outer housing main body 220*a*. It should be noted that FIG. 5 is a perspective view of the outer housing main body according to a first modified embodiment.

The support member 222*a* is preferably continuously connected between the pair of side walls 231 and 232 and formed in a straight line. The support member 222*a* is further preferably formed perpendicular to at least one of the pair of side walls 231 and 232. It goes without saying that the support member 222*a* is still further preferably formed perpendicular to both of the pair of side walls 231 and 232. By forming the support member 222*a* to have this sort of configuration, it is possible to increase the supporting strength of the side walls 231 and 232 of the outer housing 200.

Second Modified Embodiment

Figure 6:
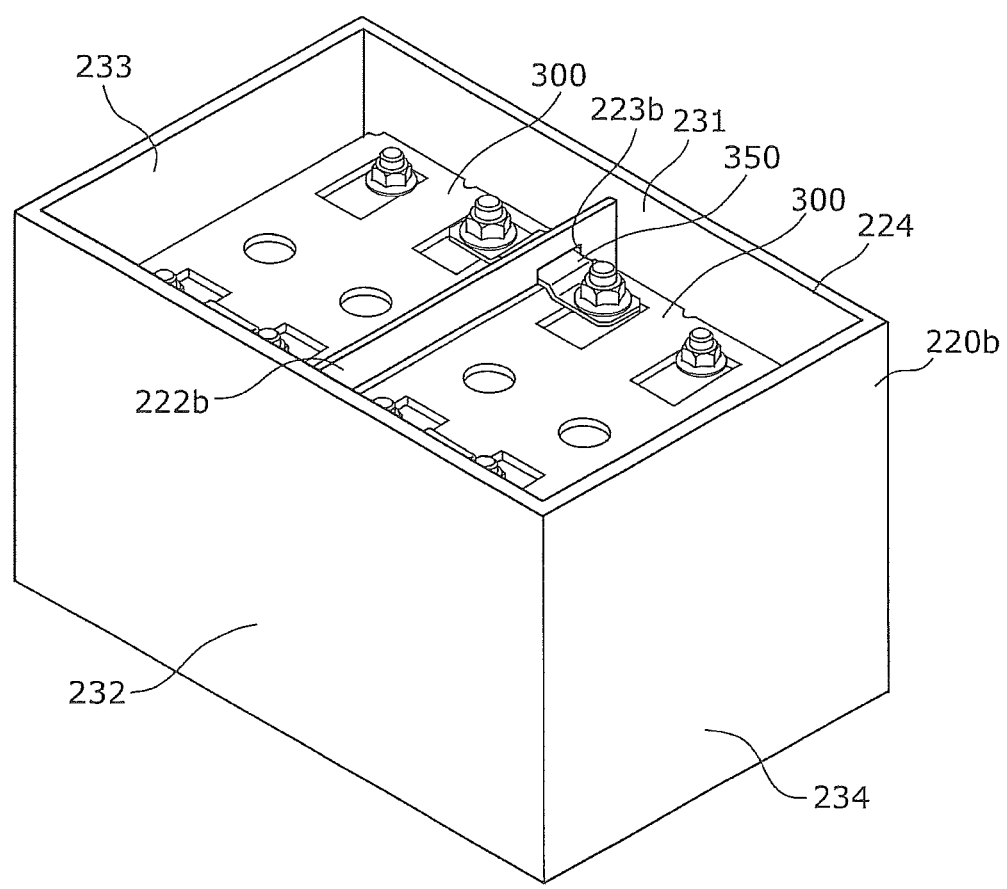
FIG. 6 is a perspective view of an assembly in which the energy storage devices are secured to the outer housing main body by the cell frames according to a second modified embodiment.

With the configuration of the energy storage apparatus 100 according to the above embodiment, a notch 223 for the bus bar 350 to pass through is formed in the second partition plate 222, but the configuration is not limited to the notch 223. For example, a through-hole 223*b* may be formed as a substitute for the notch 223, such as is illustrated in a second partition plate 222*b* in an outer housing main body 220*b* in FIG. 6. It should be noted that FIG. 6 is a perspective view of an assembly in which the energy storage devices are secured to the outer housing main body by the cell frames according to a second modified embodiment.

Third Modified Embodiment

Figure 7:
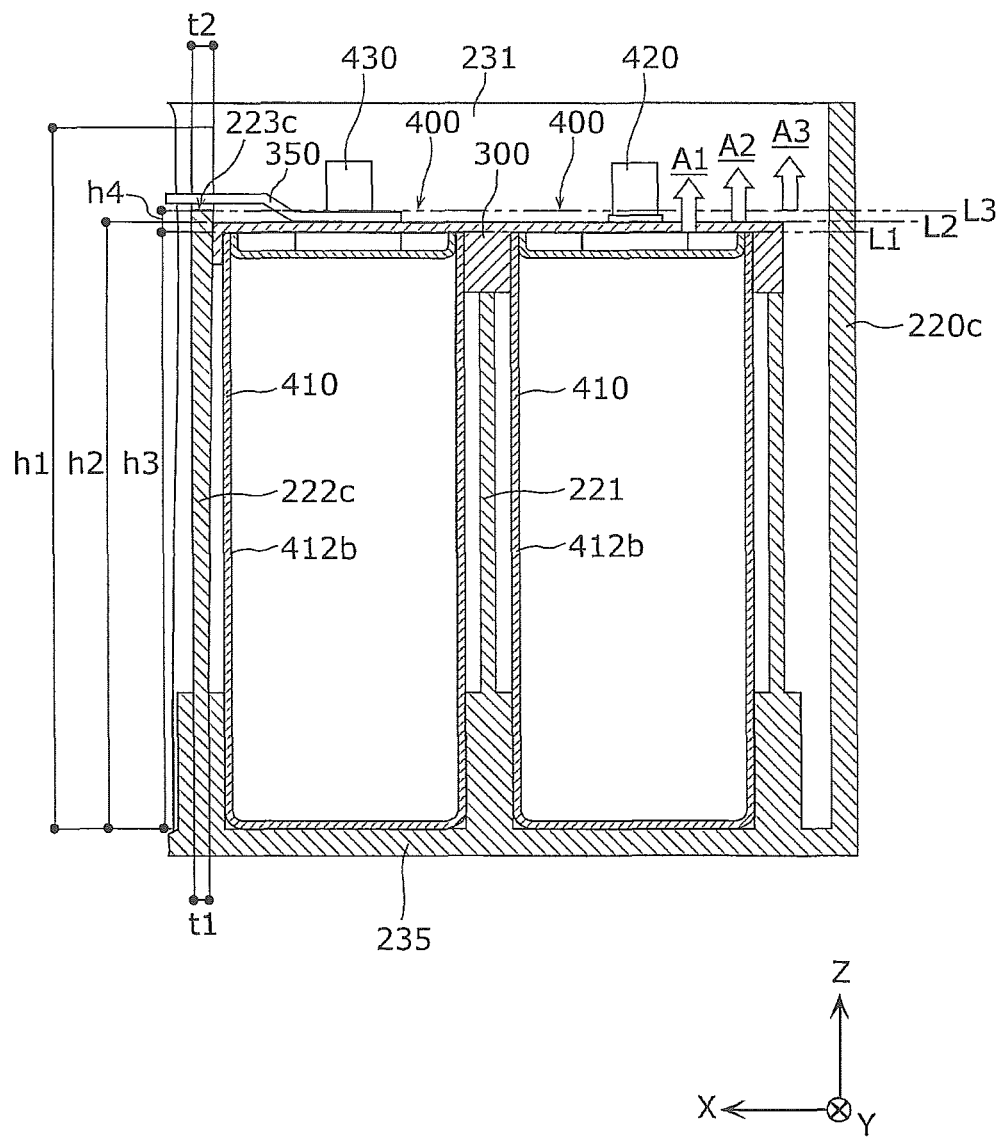
FIG. 7 is a cross section view along line IV-IV in FIG. 3 of an assembly in which the energy storage devices are secured to the outer housing main body by the cell frames according to a third modified embodiment.

With the configuration of the energy storage apparatus 100 according to the above embodiment, the second partition plate 222 has the same thickness from the bottom surface 235 to the upper end, but the configuration is not limited to this example. For example, the thickness may increase from the bottom up (in other words, in the first direction), as is the case with a second partition plate 222*c* formed in an outer housing main body 220*c* illustrated in FIG. 7. In other words, the second partition plate 222*c* has a thickness t2 at the upper portion that is thicker than a thickness t1 at the bottom portion. Since the second partition plate 222*c* increases in thickness from the bottom up, the rigidity of the second partition plate 222*c* increases from the bottom up. For this reason, the second partition plate 222*c* can further sufficiently minimize deflection of the pair of side walls 231 and 232 of the outer housing main body 220*c*. It should be noted that FIG. 7 is a cross section view along line IV-IV in FIG. 3 of an assembly in which the energy storage devices are secured to the outer housing main body by the cell frames according to a third modified embodiment.

Moreover, since the effect described above can be achieved as long as the rigidity of the second partition plate increases from the bottom up, the configuration is not limited to a thickness that increases from the bottom up. For example, the ratio of a rigid material used may increase from the bottom up.

In other words, since the rigidity of the second partition plate (support member) having this sort of configuration increases from the bottom up, it is possible to support portions of the side wall of the outer housing that are more prone to deflection with a more rigid support member. As such, the support member can further sufficiently minimize deflection of the side wall of the outer housing.

Fourth Modified Embodiment

With the configuration of the energy storage apparatus 100 according to the above embodiment, the second partition plate 222 is provided only in one location between the pair of side walls 231 and 232, but the configuration is not limited to this example. All of the first partition plates 221 may be second partition plates. Moreover, when the second partition plate functioning as the support member is provided as a partition between all of the energy storage devices 400 in the Z axis direction, it is further possible to provide the support member with the function of restricting movement of the energy storage devices 400. As such, it is not necessary to additionally provide the energy storage apparatus 100 with a component (cell frame) for restricting movement of the energy storage devices 400. This reduces the number of components in the energy storage apparatus 100 and further simplifies the structure of the energy storage apparatus 100. It should be noted that in this case the cell frame is not required to be omitted; a cell frame may be provided to each energy storage device 400.

Fifth Modified Embodiment

With the configuration of the energy storage apparatus 100 according to the above embodiment, the second partition plate 222 is provided in the vicinity of the center of the pair of side walls 231 and 232 in the X axis direction, but the location is not limited to this example. For example, the second partition plate 222 may be located in a position away from the vicinity of the center. Moreover, the second partition plate 222 is provided to support both of the pair of side walls 231 and 232, but the second partition plate 222 may be provided to support one side wall. It should be noted that in this case, deflection of the side wall may be prevented through a configuration in which a first end of the second partition plate 222 functioning as the support member is connected to the side wall at a first region of the side wall, and a second end of the second partition plate 222 functioning as the support member is in contact with or connected to any one of the following: a structure between the side wall and the cell frame; a structure between the side wall and the cover; and a structure between the side wall and the bottom surface of the outer housing. It should be noted that the second end in this case of the support member is not required to be in contact with or connected to the first region. However, when the second end of the support member is formed to be in contact with or connected to the first region, the support member does not extend as much into the housing area of the energy storage devices (in other words, the support member is disposed in a position which does not take away space from the energy storage devices), making it is easier to install the energy storage devices.

Sixth Modified Embodiment

With the configuration of the energy storage apparatus 100 according to the above embodiment, the second partition plate 222 is parallel to both the Y and Z axis directions and is connected to the pair of side walls 231 and 232, but the configuration thereof is not limited to this example. For example, the second partition plate 222 may be parallel to both the X and Z axis directions and be connected to the pair of side walls 233 and 234. Moreover, the second partition plate is not required to be parallel to the X axis direction or the Y axis direction, and as long as the second partition plate is connected in the first regions of the side walls, it is applicable since it can minimize deflection of the side walls to which it is connected.

Seventh Modified Embodiment

With the configuration of the energy storage apparatus 100 according to the above embodiment, the second partition plate 222 is integrally formed with the pair of side walls 231 and 232 of the outer housing 200, but the second partition plate 222 is not limited to being integrally formed with the pair of side walls 231 and 232 of the outer housing 200. For example, the second partition plate 222 may be a separate component from the pair of side walls 231 and 232, and may be connected with adhesive or with a physical mechanism. In other words, the configuration of the connection of the pair of side walls 231 and 232 and the second partition plate 222 is not restricted.

Eighth Modified Embodiment

With the configuration of the energy storage apparatus 100 according to the above embodiment, the cover 210 is configured such that the external surface of the engagement portion 213a engages with the internal surface of the outer housing main body 220, but the configuration is not limited to this example. For example, the internal surface of the cover may engage with the external surface of the outer housing main body. For example, the cover may sandwich the side walls of the outer housing main body from both the outer and inner sides of the outer housing main body.

Specifically in the later case, it is possible to increase the airtightness between the cover and the outer housing main body. Moreover, since the configuration is a configuration in which the cover engages with the side walls of the outer housing main body, this makes it possible to minimize deflection of the cover.

Ninth Modified Embodiment

With the configuration of the energy storage apparatus 100 according to the above embodiment, the energy storage devices 400 may each have a rectangular case, but the energy storage devices 400 may each have a cylindrical case, or the energy storage devices may be of the laminate type.

Tenth Modified Embodiment

With the configuration of the energy storage apparatus 100 according to the above embodiment, the positive electrode terminal 420 and the negative electrode terminal 430 of the energy storage devices 400 are bolt-style terminals, but the configuration is not limited to bolt-style terminals. For example, the energy storage devices may use welded terminals. It should be noted that when the energy storage device uses welded terminals as the positive electrode terminal and the negative electrode terminal, the energy storage devices are connected in series or in parallel by welding bus bars to the terminals.

The invention claimed is:

1. An energy storage apparatus, comprising:
an energy storage device that includes a case, the case including an outer surface on which an electrode terminal is disposed; and
an outer housing including a bottom surface, a side wall extending from the bottom surface in a first direction that intersects the bottom surface, and a support member that is different from the case of the energy storage device and supports the side wall,
wherein an end of the side wall in the first direction is positioned in a first region that is farther in the first direction than the outer surface of the energy storage device in the first direction,
wherein the support member includes a plate-like component formed continuously from the bottom surface to the first region connected to an inner surface of the side wall in at least the first region, and
wherein the support member is formed integrally with the bottom surface of the outer housing; and
an abutment member abutting against the outer surface of the case in the first direction,
wherein, with respect to the bottom surface of the outer housing, a height of a top surface of the support member is more than a combined height of the abutment member and the ease,
wherein the abutment member includes a plate covering an entire exposed area of the outer surface of the case,
wherein the support member is connected to the side wall in a second region, the second region being farther in the first direction than the abutment member,
wherein the energy storage device includes a plurality of energy storage devices,
wherein the outer housing houses the energy storage devices,
wherein the support member comprises a partition that is provided between the energy storage devices and partitions a housing space that is formed by the outer housing and houses the energy storage devices, and
wherein the support member is integrally formed with the side wall.

2. The energy storage apparatus according to claim 1, wherein the side wall comprises a pair of side walls opposed to each other, and
wherein the support member is connected to the pair of side walls in at least the first region.

3. The energy storage apparatus according to claim 1, wherein the outer housing includes a cover including an engagement portion that engages with the side wall.

4. The energy storage apparatus according to claim 1, wherein the support member includes a notch or a through-hole.

5. The energy storage apparatus according to claim 1, wherein the side wall of the outer housing extends in the first direction and in a second direction that intersects the first direction, and
wherein the support member is integrally formed with the side wall in a vicinity of a center of the side wall in the second direction.

6. The energy storage apparatus according to claim 1, wherein the support member increases its rigidity as it extends in the first direction.

7. The energy storage apparatus according to claim 6, wherein the support member increases its thickness as it extends in the first direction.

8. The energy storage apparatus according to claim 1, wherein the electrode terminal, disposed on the outer surface, comprises a positive electrode terminal and a negative electrode terminal.

9. The energy storage apparatus according to claim 1, wherein the support member includes an indentation configured to pass a bus bar that is connected to the energy storage device.

10. The energy storage apparatus according to claim 9, wherein the indentation of the support member extends in the first direction to an upper surface of support member such that the bus bar is exposed from the support member.

11. The energy storage apparatus according to claim 9, wherein another energy storage device of the energy storage devices is connected to the bus bar and is disposed on an opposing side of the support member with respect to a side of the support member that faces the energy storage device.

12. The energy storage apparatus according to claim 11, wherein the bus bar connects the electrode terminal of the energy storage device to an electrode terminal of said another energy storage device by passing through the indentation of the support member.

13. The energy storage apparatus according to claim 11, wherein the support member completely isolates the energy storage device from said another energy storage device such that an entirety of said energy storage device is not exposed to said another energy storage device.

14. The energy storage apparatus according to claim 1, wherein the support member is an integral part of the side wall such that the support member and the side wall are a single piece.

15. The energy storage apparatus according to claim 1, wherein, in the first direction, a thickness of the support member continuously increases as the support member extends from the bottom surface of the outer housing to an upper surface of the support member.

16. An energy storage apparatus, comprising:
a first energy storage device and a second energy storage device;
a bus bar that connects a terminal of the first energy storage device to a terminal of the second energy storage device; and
an outer housing including a bottom surface, a side wall extending from the bottom surface in a first direction, and a support member that supports the side wall,
wherein an upper edge of the side wall is positioned in a first region that is positioned farther from the bottom surface than an end of a case of the first energy storage device, the support member being different from the case,
wherein the support member includes a plate-like component formed continuously from the bottom surface to the first region connected to an inner surface of the side wall in at least the first region between the first energy storage device and the second energy storage device, and
wherein the support member is formed integrally with the bottom surface of the outer housing; and
an abutment member abutting against an outer surface of the case in the first direction and including a plate covering an entire exposed area of the outer surface of the case,
wherein, with respect to the bottom surface of the outer housing, a height of a top surface of the support member is more than a combined height of the plate of the abutment member and the case.

17. The energy storage apparatus according to claim 16, wherein the abutment member extends in a second direction, which intersects the first direction, above the first energy storage device and the second energy storage device.

18. An energy storage apparatus, comprising:
a first energy storage device and a second energy storage device each including a case, the case including an outer surface on which an electrode terminal is disposed;
a bus bar that connects a terminal of the first energy storage device to a terminal of the second energy storage device; and
an outer housing including a bottom surface, a side wall extending from the bottom surface in a first direction that intersects the bottom surface, and a support member that is different from the case of the first energy storage device, and supports the side wall,
wherein an end of the side wall in the first direction is positioned in a first region that is farther in the first direction than the outer surface of the first energy storage device in the first direction,
wherein the support member includes a plate-like component formed continuously from the bottom surface, the support member being connected to an inner surface of the side wall in at least the first region between the first energy storage device and the second energy storage device, and
wherein the support member includes an integrally-formed indentation configured to pass the bus bar that is connected to the first energy storage device and the second energy storage device; and
an abutment member abutting against the outer surface of the case in the first direction and including a plate covering an entire exposed area of the outer surface of the case,
wherein, with respect to the bottom surface of the outer housing, a height of a top surface of the support member is more than a combined height of the plate of the abutment member and the case,
wherein the support member is connected to the side wall in a second region, the second region being farther in the first direction than the abutment member,
wherein the outer housing houses the first energy storage device and the second energy storage device,
wherein the support member comprises a partition that is provided between the first energy storage device and the second energy storage device, and partitions a housing space that is formed by the outer housing, the housing space housing the first energy storage device and the second energy storage device, and
wherein the support member is integrally formed with the side wall.

19. The energy storage apparatus according to claim 1, wherein the outer housing further includes a first outer wall and a second outer wall each extending from the bottom surface in the first direction, the side wall extending between the first outer wall and the second outer wall.

20. The energy storage apparatus according to claim 19, wherein the support member faces the first outer wall and the second outer wall, and
wherein an entirety of the support member is located inside the outer housing between the first outer wall and the second outer wall.

* * * * *